(12) United States Patent
Bless et al.

(10) Patent No.: US 12,057,759 B2
(45) Date of Patent: Aug. 6, 2024

(54) AEROSOL DELIVERY DEVICE INCLUDING AN ELECTRICAL GENERATOR ASSEMBLY

(71) Applicant: RAI Strategic Holdings, Inc., Winston-Salem, NC (US)

(72) Inventors: Alfred C. Bless, Asheboro, NC (US); Rajesh Sur, Winston-Salem, NC (US); Stephen Benson Sears, Siler City, NC (US)

(73) Assignee: RAI STRATEGIC HOLDINGS, INC., Winston-Salem, NC (US)

( * ) Notice: Subject to any disclaimer, the term of this patent is extended or adjusted under 35 U.S.C. 154(b) by 0 days.

(21) Appl. No.: 18/314,612

(22) Filed: May 9, 2023

(65) Prior Publication Data

US 2023/0283147 A1   Sep. 7, 2023

Related U.S. Application Data

(60) Continuation of application No. 17/185,235, filed on Feb. 25, 2021, now Pat. No. 11,682,946, which is a
(Continued)

(51) Int. Cl.
*H02K 7/18* (2006.01)
*A24F 40/10* (2020.01)
(Continued)

(52) U.S. Cl.
CPC ........... *H02K 7/1853* (2013.01); *A24F 40/50* (2020.01); *A24F 40/90* (2020.01); *H02K 7/02* (2013.01); *H02K 7/116* (2013.01); *A24F 40/10* (2020.01)

(58) Field of Classification Search
CPC .......... A24F 40/10; A24F 40/50; A24F 40/90; A24F 47/008; H02K 7/02; H02K 7/116;
(Continued)

(56) References Cited

U.S. PATENT DOCUMENTS

| 1,771,366 A | 7/1930 | Wyss et al. |
| 2,057,353 A | 10/1936 | Whittemore, Jr. |

(Continued)

FOREIGN PATENT DOCUMENTS

| AU | 276250 A | 7/1965 |
| CA | 2641869 A1 | 5/2010 |

(Continued)

OTHER PUBLICATIONS

Muchbuy.com, 4 Different Hand Crank All-Purpose LED Flashlight, <http://www.muchbuy.com/4-different-hand-crank-all-purpose-led-flashlight.html>, Retrieved Jun. 20, 2016.
(Continued)

*Primary Examiner* — Dana Ross
*Assistant Examiner* — James F Sims, III
(74) *Attorney, Agent, or Firm* — Womble Bond Dickinson (US) LLP

(57) ABSTRACT

The present disclosure relates to aerosol delivery devices. The aerosol delivery devices may include an atomizer, a reservoir configured to contain an aerosol precursor composition and an electrical circuit coupled to the atomizer. The electrical circuit may include an electrical generator assembly including a moveable input member and an electrical generator configured to produce an electrical current from movement of the moveable input member. The electrical circuit may be configured to direct the electrical current to the atomizer to produce an aerosol from the aerosol precursor composition. A related aerosol production method is also provided.

16 Claims, 7 Drawing Sheets

Related U.S. Application Data division of application No. 15/187,489, filed on Jun. 20, 2016, now Pat. No. 10,959,458.

(51) Int. Cl.
  *A24F 40/50* (2020.01)
  *A24F 40/90* (2020.01)
  *H02K 7/02* (2006.01)
  *H02K 7/116* (2006.01)

(58) Field of Classification Search
  CPC ..... H02K 7/1853; A61M 15/06; A01G 13/06; B01D 1/0017; A61L 9/03; A61L 9/12; A24C 1/00
  USPC .................................. 392/386–390, 403–404
  See application file for complete search history.

(56) References Cited

U.S. PATENT DOCUMENTS

| | | |
|---|---|---|
| 2,104,266 A | 1/1938 | McCormick |
| 3,200,819 A | 8/1965 | Gilbert |
| 4,284,089 A | 8/1981 | Ray |
| 4,303,083 A | 12/1981 | Burruss, Jr. |
| 4,735,217 A | 4/1988 | Gerth et al. |
| 4,848,374 A | 7/1989 | Chard et al. |
| 4,907,606 A | 3/1990 | Lilja et al. |
| 4,922,901 A | 5/1990 | Brooks et al. |
| 4,924,123 A | 5/1990 | Hamajima et al. |
| 4,945,931 A | 8/1990 | Gori |
| 4,947,874 A | 8/1990 | Brooks et al. |
| 4,947,875 A | 8/1990 | Brooks et al. |
| 4,986,286 A | 1/1991 | Roberts et al. |
| 5,019,122 A | 5/1991 | Clearman et al. |
| 5,042,510 A | 8/1991 | Curtiss et al. |
| 5,060,671 A | 10/1991 | Counts et al. |
| 5,093,894 A | 3/1992 | Deevi et al. |
| 5,144,962 A | 9/1992 | Counts et al. |
| 5,249,586 A | 10/1993 | Morgan et al. |
| 5,261,424 A | 11/1993 | Sprinkel, Jr. |
| 5,322,075 A | 6/1994 | Deevi et al. |
| 5,353,813 A | 10/1994 | Deevi et al. |
| 5,369,723 A | 11/1994 | Counts et al. |
| 5,372,148 A | 12/1994 | McCafferty et al. |
| 5,388,574 A | 2/1995 | Ingebrethsen |
| 5,408,574 A | 4/1995 | Deevi et al. |
| 5,468,936 A | 11/1995 | Deevi et al. |
| 5,498,850 A | 3/1996 | Das |
| 5,515,842 A | 5/1996 | Ramseyer et al. |
| 5,530,225 A | 6/1996 | Hajaligol |
| 5,564,442 A | 10/1996 | MacDonald et al. |
| 5,649,554 A | 7/1997 | Sprinkel et al. |
| 5,666,977 A | 9/1997 | Higgins et al. |
| 5,687,746 A | 11/1997 | Rose et al. |
| 5,726,421 A | 3/1998 | Fleischhauer et al. |
| 5,727,571 A | 3/1998 | Meiring et al. |
| 5,743,251 A | 4/1998 | Howell et al. |
| 5,799,663 A | 9/1998 | Gross et al. |
| 5,819,756 A | 10/1998 | Mielordt |
| 5,865,185 A | 2/1999 | Collins et al. |
| 5,865,186 A | 2/1999 | Volsey, II |
| 5,878,752 A | 3/1999 | Adams et al. |
| 5,894,841 A | 4/1999 | Voges |
| 5,905,359 A | 5/1999 | Jimena |
| 5,934,289 A | 8/1999 | Watkins et al. |
| 5,954,979 A | 9/1999 | Counts et al. |
| 5,967,148 A | 10/1999 | Harris et al. |
| 6,040,560 A | 3/2000 | Fleischhauer et al. |
| 6,053,176 A | 4/2000 | Adams et al. |
| 6,089,857 A | 7/2000 | Matsuura et al. |
| 6,095,153 A | 8/2000 | Kessler et al. |
| 6,125,853 A | 10/2000 | Susa et al. |
| 6,155,268 A | 12/2000 | Takeuchi |
| 6,164,287 A | 12/2000 | White |
| 6,196,218 B1 | 3/2001 | Voges |
| 6,196,219 B1 | 3/2001 | Hess et al. |
| 6,598,607 B2 | 7/2003 | Adiga et al. |
| 6,601,776 B1 | 8/2003 | Oljaca et al. |
| 6,615,840 B1 | 9/2003 | Fournier et al. |
| 6,688,313 B2 | 2/2004 | Wrenn et al. |
| 6,772,756 B2 | 8/2004 | Shayan |
| 6,803,545 B2 | 10/2004 | Blake et al. |
| 6,854,461 B2 | 2/2005 | Nichols et al. |
| 6,854,470 B1 | 2/2005 | Pu |
| 7,117,867 B2 | 10/2006 | Cox et al. |
| 7,293,565 B2 | 11/2007 | Griffin et al. |
| 7,513,253 B2 | 4/2009 | Kobayashi et al. |
| 7,723,880 B2 | 5/2010 | Dai |
| 7,775,459 B2 | 8/2010 | Martens, III et al. |
| 7,832,410 B2 | 11/2010 | Hon |
| 7,845,359 B2 | 12/2010 | Montaser |
| 7,896,006 B2 | 3/2011 | Hamano et al. |
| 8,127,772 B2 | 3/2012 | Montaser |
| 8,314,591 B2 | 11/2012 | Terry et al. |
| 8,365,742 B2 | 2/2013 | Hon |
| 8,402,976 B2 | 3/2013 | Fernando et al. |
| 8,499,766 B1 | 8/2013 | Newton |
| 8,528,569 B1 | 9/2013 | Newton |
| 8,550,069 B2 | 10/2013 | Alelov |
| 8,851,081 B2 | 10/2014 | Fernando et al. |
| 8,975,764 B1 | 3/2015 | Abehasera |
| 2002/0146242 A1 | 10/2002 | Vieira |
| 2003/0226837 A1 | 12/2003 | Blake et al. |
| 2004/0118401 A1 | 6/2004 | Smith et al. |
| 2004/0129280 A1 | 7/2004 | Woodson et al. |
| 2004/0200488 A1 | 10/2004 | Felter et al. |
| 2004/0226568 A1 | 11/2004 | Takeuchi et al. |
| 2005/0016550 A1 | 1/2005 | Katase |
| 2006/0016453 A1 | 1/2006 | Kim |
| 2006/0196518 A1 | 9/2006 | Hon |
| 2007/0074734 A1 | 4/2007 | Braunshteyn et al. |
| 2007/0102013 A1 | 5/2007 | Adams et al. |
| 2007/0102928 A1 | 5/2007 | Yang |
| 2007/0215167 A1 | 9/2007 | Llewellyn Crooks et al. |
| 2008/0085103 A1 | 4/2008 | Beland et al. |
| 2008/0092912 A1 | 4/2008 | Robinson et al. |
| 2008/0257367 A1 | 10/2008 | Paterno et al. |
| 2008/0276947 A1 | 11/2008 | Martzel |
| 2008/0302374 A1 | 12/2008 | Wengert et al. |
| 2009/0095311 A1 | 4/2009 | Han |
| 2009/0095312 A1 | 4/2009 | Herbrich et al. |
| 2009/0126745 A1 | 5/2009 | Hon |
| 2009/0188490 A1 | 7/2009 | Han |
| 2009/0230117 A1 | 9/2009 | Fernando et al. |
| 2009/0272379 A1 | 11/2009 | Thorens et al. |
| 2009/0283103 A1 | 11/2009 | Nielsen et al. |
| 2009/0320863 A1 | 12/2009 | Fernando et al. |
| 2010/0043809 A1 | 2/2010 | Magnon |
| 2010/0083959 A1 | 4/2010 | Siller |
| 2010/0200006 A1 | 8/2010 | Robinson et al. |
| 2010/0229881 A1 | 9/2010 | Hearn |
| 2010/0242974 A1 | 9/2010 | Pan |
| 2010/0307518 A1 | 12/2010 | Wang |
| 2010/0313901 A1 | 12/2010 | Fernando et al. |
| 2011/0005535 A1 | 1/2011 | Xiu |
| 2011/0011396 A1 | 1/2011 | Fang |
| 2011/0036363 A1 | 2/2011 | Urtsev et al. |
| 2011/0036365 A1 | 2/2011 | Chong et al. |
| 2011/0094523 A1 | 4/2011 | Thorens et al. |
| 2011/0126848 A1 | 6/2011 | Zuber et al. |
| 2011/0155153 A1 | 6/2011 | Thorens et al. |
| 2011/0155718 A1 | 6/2011 | Greim et al. |
| 2011/0168194 A1 | 7/2011 | Hon |
| 2011/0265806 A1 | 11/2011 | Alarcon et al. |
| 2011/0309157 A1 | 12/2011 | Yang et al. |
| 2012/0042885 A1 | 2/2012 | Stone et al. |
| 2012/0060853 A1 | 3/2012 | Robinson et al. |
| 2012/0111347 A1 | 5/2012 | Hon |
| 2012/0132643 A1 | 5/2012 | Choi et al. |
| 2012/0227752 A1 | 9/2012 | Alelov |
| 2012/0231464 A1 | 9/2012 | Yu et al. |
| 2012/0260927 A1 | 10/2012 | Liu |
| 2012/0279512 A1 | 11/2012 | Hon |
| 2012/0318882 A1 | 12/2012 | Abehasera |

(56) References Cited

U.S. PATENT DOCUMENTS

| | | |
|---|---|---|
| 2013/0037041 A1 | 2/2013 | Worm et al. |
| 2013/0056013 A1 | 3/2013 | Terry et al. |
| 2013/0081625 A1 | 4/2013 | Rustad et al. |
| 2013/0081642 A1 | 4/2013 | Safari |
| 2013/0192619 A1 | 8/2013 | Tucker et al. |
| 2013/0255702 A1 | 10/2013 | Griffith, Jr. et al. |
| 2013/0306084 A1 | 11/2013 | Flick |
| 2013/0319439 A1 | 12/2013 | Gorelick et al. |
| 2013/0340750 A1 | 12/2013 | Thorens et al. |
| 2013/0340775 A1 | 12/2013 | Juster et al. |
| 2014/0000638 A1 | 1/2014 | Sebastian et al. |
| 2014/0060554 A1 | 3/2014 | Collett et al. |
| 2014/0060555 A1 | 3/2014 | Chang et al. |
| 2014/0096781 A1 | 4/2014 | Sears et al. |
| 2014/0096782 A1 | 4/2014 | Ampolini et al. |
| 2014/0109921 A1 | 4/2014 | Chen |
| 2014/0157583 A1 | 6/2014 | Ward et al. |
| 2014/0196732 A1 | 7/2014 | Liu |
| 2014/0209105 A1 | 7/2014 | Sears et al. |
| 2014/0253144 A1 | 9/2014 | Novak, III et al. |
| 2014/0261408 A1 | 9/2014 | DePiano et al. |
| 2014/0261486 A1 | 9/2014 | Potter et al. |
| 2014/0261487 A1 | 9/2014 | Chapman et al. |
| 2014/0261488 A1* | 9/2014 | Tucker ............ A24F 40/50 131/328 |
| 2014/0261495 A1 | 9/2014 | Novak, III et al. |
| 2014/0270727 A1 | 9/2014 | Ampolini et al. |
| 2014/0270729 A1 | 9/2014 | DePiano et al. |
| 2014/0270730 A1 | 9/2014 | DePiano et al. |
| 2014/0345631 A1 | 11/2014 | Bowen et al. |
| 2015/0007838 A1 | 1/2015 | Fernando et al. |
| 2015/0034102 A1* | 2/2015 | Faramarzian ...... A24F 40/40 131/328 |
| 2015/0053217 A1 | 2/2015 | Steingraber et al. |
| 2015/0122278 A1 | 5/2015 | Hardgrove et al. |
| 2015/0245654 A1 | 9/2015 | Memari et al. |
| 2016/0037826 A1 | 2/2016 | Hearn et al. |
| 2016/0050975 A1 | 2/2016 | Worm et al. |
| 2016/0073692 A1 | 3/2016 | Alarcon et al. |

FOREIGN PATENT DOCUMENTS

| | | |
|---|---|---|
| CN | 1541577 A | 11/2004 |
| CN | 2719043 Y | 8/2005 |
| CN | 200997909 Y | 1/2008 |
| CN | 101116542 A | 2/2008 |
| CN | 101176805 A | 5/2008 |
| CN | 201379072 Y | 1/2010 |
| CN | 203235107 U | 10/2013 |
| CN | 203762294 U | 8/2014 |
| CN | 104323427 A | 2/2015 |
| CN | 204259819 U | 4/2015 |
| DE | 102006004484 A1 | 8/2007 |
| DE | 102006041042 A1 | 3/2008 |
| DE | 202009010400 U1 | 11/2009 |
| EP | 0295122 A2 | 12/1988 |
| EP | 0430566 A2 | 6/1991 |
| EP | 0845220 A1 | 6/1998 |
| EP | 1618803 A1 | 1/2006 |
| EP | 2316286 A1 | 5/2011 |
| GB | 2469850 A | 11/2010 |
| RU | 2308643 C1 | 10/2007 |
| WO | WO-1997027640 A1 | 7/1997 |
| WO | WO-1997048293 A1 | 12/1997 |
| WO | WO-2003034847 A1 | 5/2003 |
| WO | WO-2004043175 A1 | 5/2004 |
| WO | WO-2004080216 A1 | 9/2004 |
| WO | WO-2005099494 A1 | 10/2005 |
| WO | WO-2007078273 A1 | 7/2007 |
| WO | WO-2007131449 A1 | 11/2007 |
| WO | WO-2009105919 A1 | 9/2009 |
| WO | WO-2009155734 A1 | 12/2009 |
| WO | WO-2010003480 A1 | 1/2010 |
| WO | WO-2010045670 A1 | 4/2010 |
| WO | WO-2010073122 A1 | 7/2010 |
| WO | WO-2010118644 A1 | 10/2010 |
| WO | WO-2010140937 A1 | 12/2010 |
| WO | WO-2011010334 A1 | 1/2011 |
| WO | WO-2012072762 A1 | 6/2012 |
| WO | WO-2012100523 A1 | 8/2012 |
| WO | WO-2013089551 A1 | 6/2013 |
| WO | WO-2015119918 A1 | 8/2015 |
| WO | WO-2016026756 A1 | 2/2016 |

OTHER PUBLICATIONS

International Search Report dated Aug. 25, 2017 for International Application No. PCT/IB2017/053439.

* cited by examiner

PRODUCE AN ELECTRICAL CURRENT WITH AN ELECTRICAL GENERATOR ASSEMBLY COMPRISING A MOVEABLE INPUT MEMBER —302

DIRECT THE ELECTRICAL CURRENT TO AN ATOMIZER CONFIGURED TO RECEIVE AN AEROSOL PRECURSOR COMPOSITION FROM A RESERVOIR TO HEAT THE AEROSOL PRECURSOR COMPOSITION AND PRODUCE AN AEROSOL —304

FIG. 7

AEROSOL DELIVERY DEVICE INCLUDING AN ELECTRICAL GENERATOR ASSEMBLY

CROSS-REFERENCE TO RELATED APPLICATIONS

This application is a continuation of U.S. application Ser. No. 17/185,235, filed on Feb. 25, 2021, which is a divisional of U.S. application Ser. No. 15/187,489, filed on Jun. 20, 2016, now U.S. Pat. No. 10,959,458, the disclosures of which are hereby incorporated by reference herein their entireties.

FIELD OF THE DISCLOSURE

The present disclosure relates to aerosol delivery devices, and more particularly, to electrical power mechanisms for aerosol delivery devices. The aerosol delivery device may include an atomizer configured to produce an aerosol from an aerosol precursor composition. The aerosol precursor composition, which may include components made or derived from tobacco or otherwise incorporate tobacco, may be heated by a heating element of the atomizer to produce an inhalable substance for human consumption.

BACKGROUND

Many smoking devices have been proposed through the years as improvements upon, or alternatives to, smoking products that require combusting tobacco for use. Many of those devices purportedly have been designed to provide the sensations associated with cigarette, cigar or pipe smoking, but without delivering considerable quantities of incomplete combustion and pyrolysis products that result from the burning of tobacco. To this end, there have been proposed numerous smoking products, flavor generators and medicinal inhalers that utilize electrical energy to vaporize or heat a volatile material, or attempt to provide the sensations of cigarette, cigar or pipe smoking without burning tobacco to a significant degree. See, for example, the various alternative smoking articles, aerosol delivery devices and heat generating sources set forth in the background art described in U.S. Pat. No. 7,726,320 to Robinson et al. and U.S. Pat. No. 8,881,737 to Collett et al., which are incorporated herein by reference. See also, for example, the various types of smoking articles, aerosol delivery devices and electrically-powered heat generating sources referenced by brand name and commercial source in U.S. Pat. Pub. No. 2015/0216232 to Bless et al., which is incorporated herein by reference. Additionally, various types of electrically-powered aerosol and vapor delivery devices also have been proposed in U.S. Pat. App. Pub. Nos. 2014/0096781 to Sears et al.; 2014/0283859 to Minskoff et al.; 2015/0335070 to Sears et al.; 2015/0335071 to Brinkley et al.; 2016/0007651 to Ampolini et al. and 2016/0050975 to Worm et al.; all of which are incorporated herein by reference.

Certain existing embodiments of aerosol delivery devices include a control body and a cartridge. An electrical power source (e.g., a battery) may be positioned in the control body and an aerosol precursor composition may be positioned in a reservoir in the cartridge. The battery may be rechargeable via a power adapter to allow for reuse thereof. However, usage of alternative electrical techniques for powering an aerosol delivery device may be desirable.

BRIEF SUMMARY OF THE DISCLOSURE

The present disclosure relates to aerosol delivery devices which, in certain embodiments, may be characterized as electronic cigarettes. In one aspect an aerosol delivery device is provided. The aerosol delivery device may include a housing and an electrical circuit. The electrical circuit may include an electrical generator assembly including a moveable input member extending out of the housing. Further, the electrical circuit may include an electrical generator configured to produce an electrical current from movement of the moveable input member. The electrical circuit may additionally include a connector configured to direct the electrical current to an atomizer to produce an aerosol from an aerosol precursor composition.

In some embodiments the electrical circuit may additionally include an electrical storage device configured to receive and store the electrical current. The electrical circuit may further include a switch configured to selectively direct the electrical current from the electrical storage device to the connector. Additionally, the electrical circuit may include an external power input configured to charge the electrical storage device. The connector may include a coupler configured to engage a cartridge including the atomizer and a reservoir containing the aerosol precursor composition.

In some embodiments the electrical generator assembly may further include a generator shaft extending from the electrical generator. The moveable input member may be configured to rotate the generator shaft of the electrical generator assembly. The moveable input member may include a lever. The moveable input member may further include a gear track. The electrical generator assembly may further include a transfer gear assembly. The gear track may be configured to engage and rotate the transfer gear assembly. The transfer gear assembly may be configured to rotate the generator shaft extending from the electrical generator. The electrical generator assembly may further include a flywheel assembly. The transfer gear assembly may be engaged with the flywheel assembly and the flywheel assembly may be engaged with the generator shaft extending from the electrical generator. The transfer gear assembly may include an input gear and an output gear. The gear track may be engaged with the input gear and the flywheel assembly may be engaged with the output gear.

In an additional aspect an aerosol delivery device is provided. The aerosol delivery device may include the control body, the atomizer, and a reservoir containing the aerosol precursor composition.

In an additional aspect an aerosol production method is provided. The method may include producing an electrical current with an electrical generator assembly including a moveable input member. The moveable input member may extend out of a housing. Further, the method may include directing the electrical current to an atomizer configured to receive an aerosol precursor composition from a reservoir to heat the aerosol precursor composition and produce an aerosol. The atomizer and the reservoir may be engaged with or received within the housing.

In some embodiments the method may further include receiving and storing the electrical current in an electrical storage device prior to directing the electrical current to the atomizer. Directing the electrical current to the atomizer may include directing the electrical current to the atomizer in response to receipt of an input from a switch. Additionally, the method may include charging the electrical storage device with an external current from an external power source positioned outside of the housing. Directing the electrical current to the atomizer may further include directing the electrical current through a coupler to a cartridge including the atomizer and the reservoir.

In some embodiments producing the electrical current with the electrical generator assembly may include rotating a generator shaft extending from an electrical generator with the moveable input member. Producing the electrical current with the electrical generator assembly may further include rotating a transfer gear assembly with the moveable input member. Producing the electrical current with the electrical generator assembly may further include rotating a flywheel assembly. Producing the electrical current with the electrical generator assembly may further include engaging an input gear of the transfer gear assembly with the moveable input member and engaging an output gear of the transfer gear assembly with the flywheel assembly.

These and other features, aspects, and advantages of the disclosure will be apparent from a reading of the following detailed description together with the accompanying drawings, which are briefly described below.

BRIEF DESCRIPTION OF THE FIGURES

Figure 1:
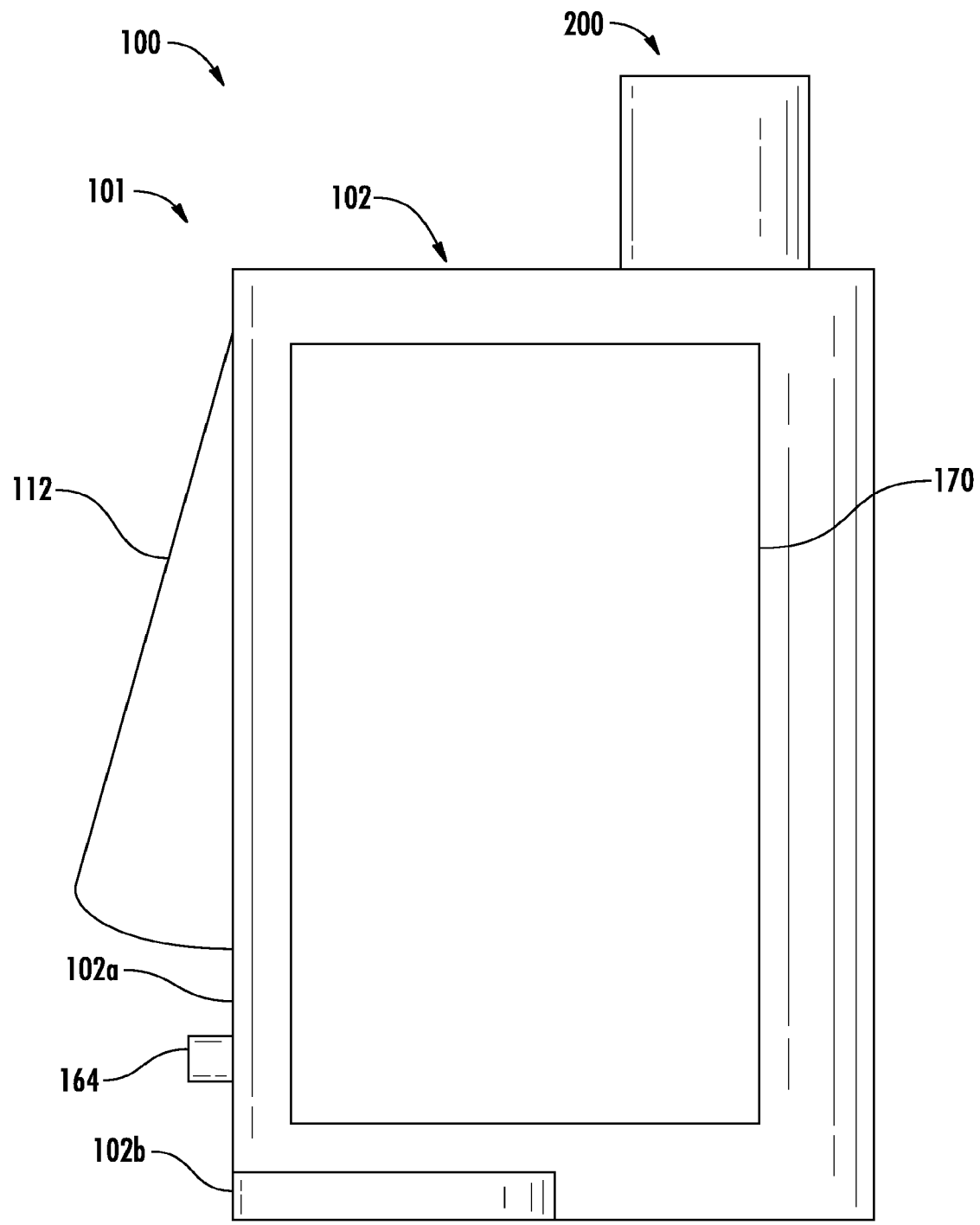
Figure 2:
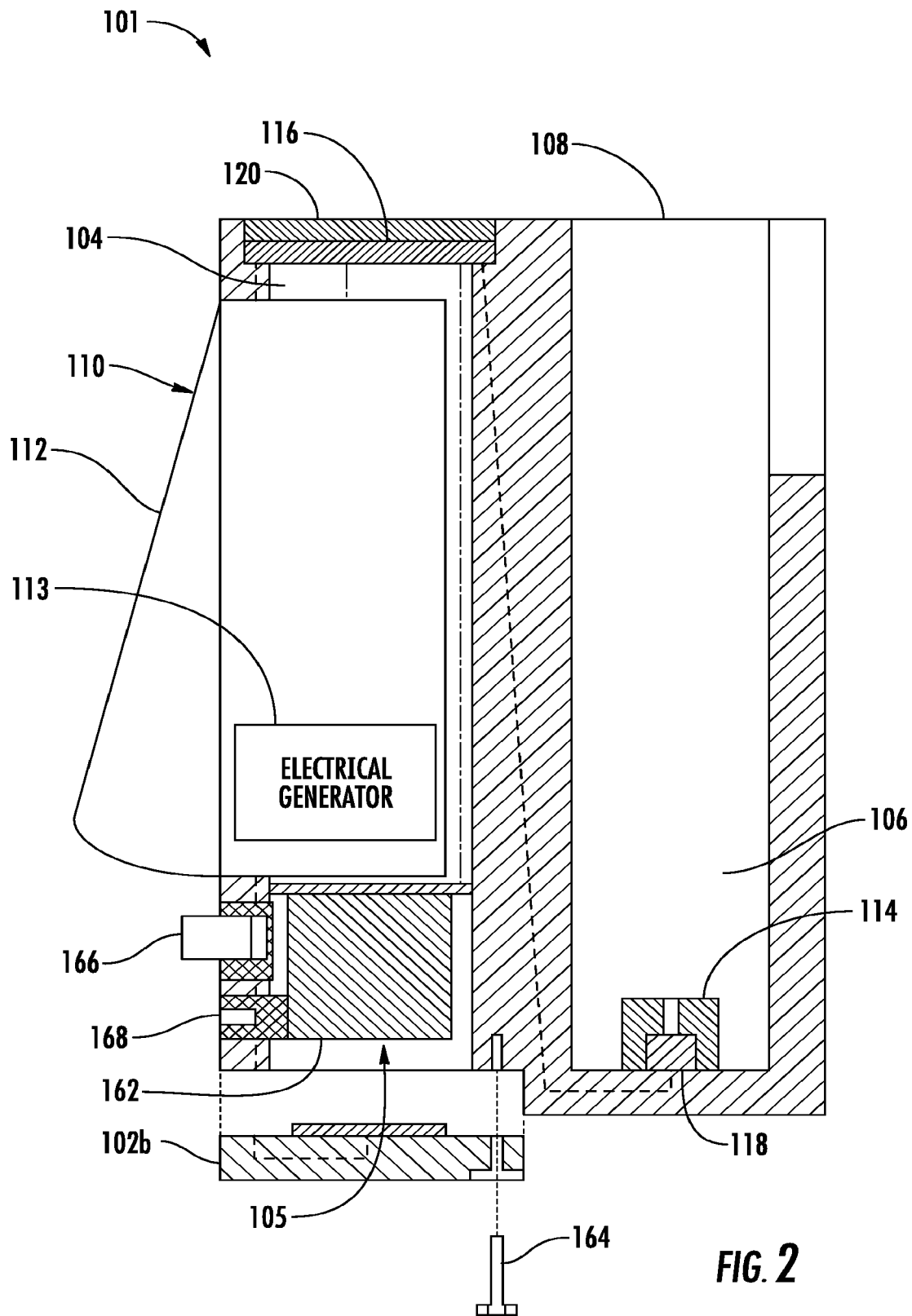
Figure 3:
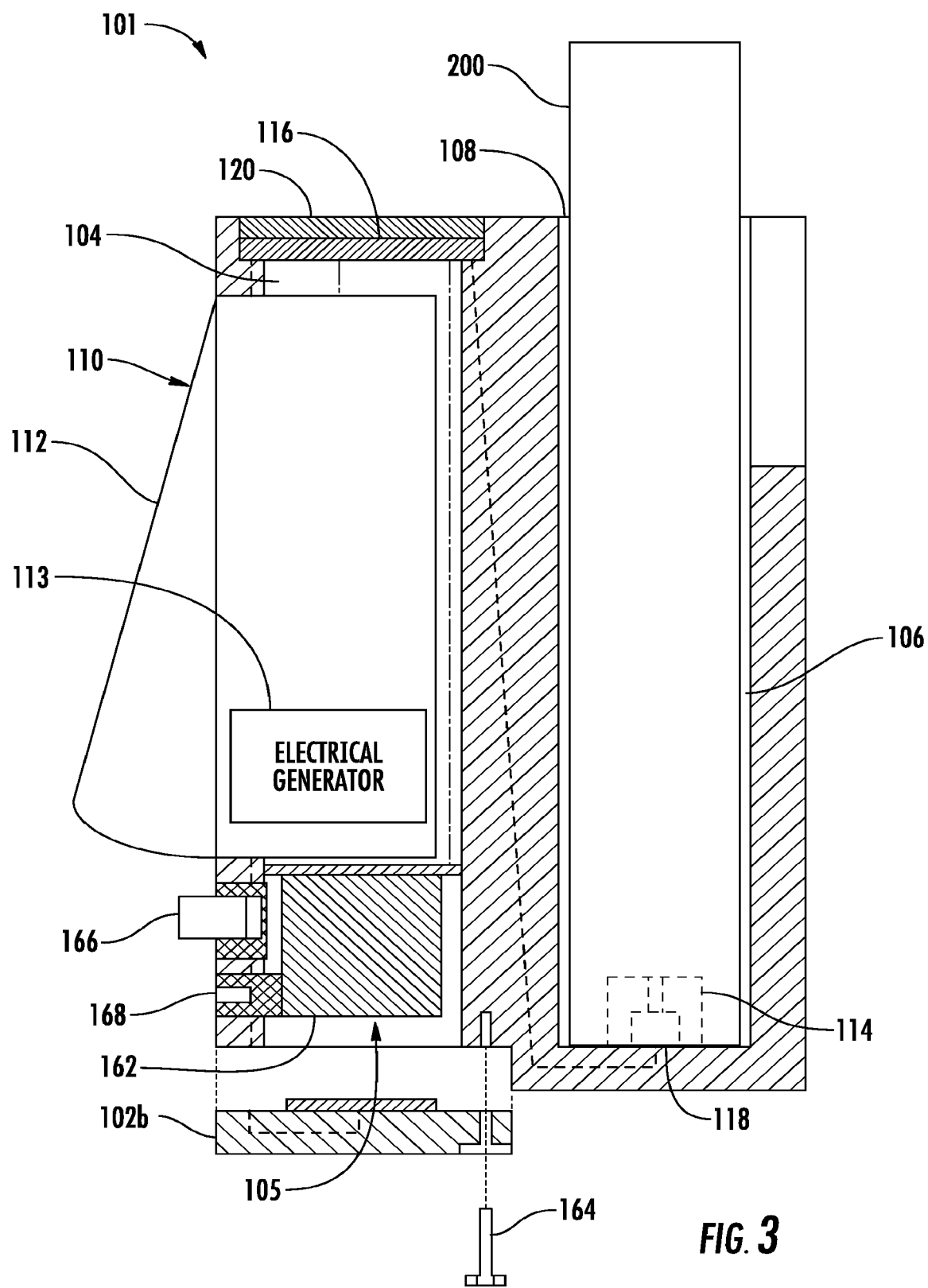
Figure 4:
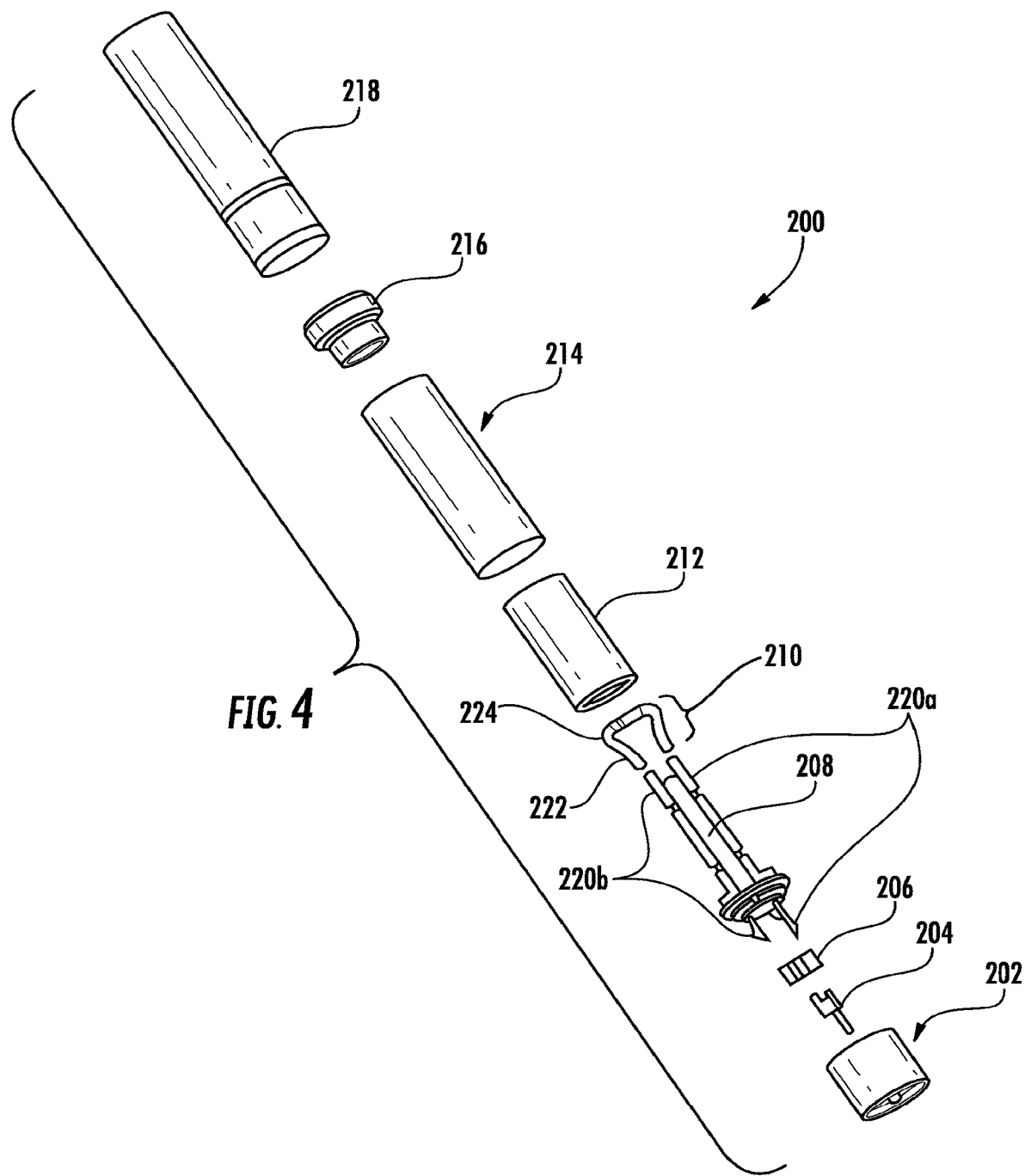
Figure 5:
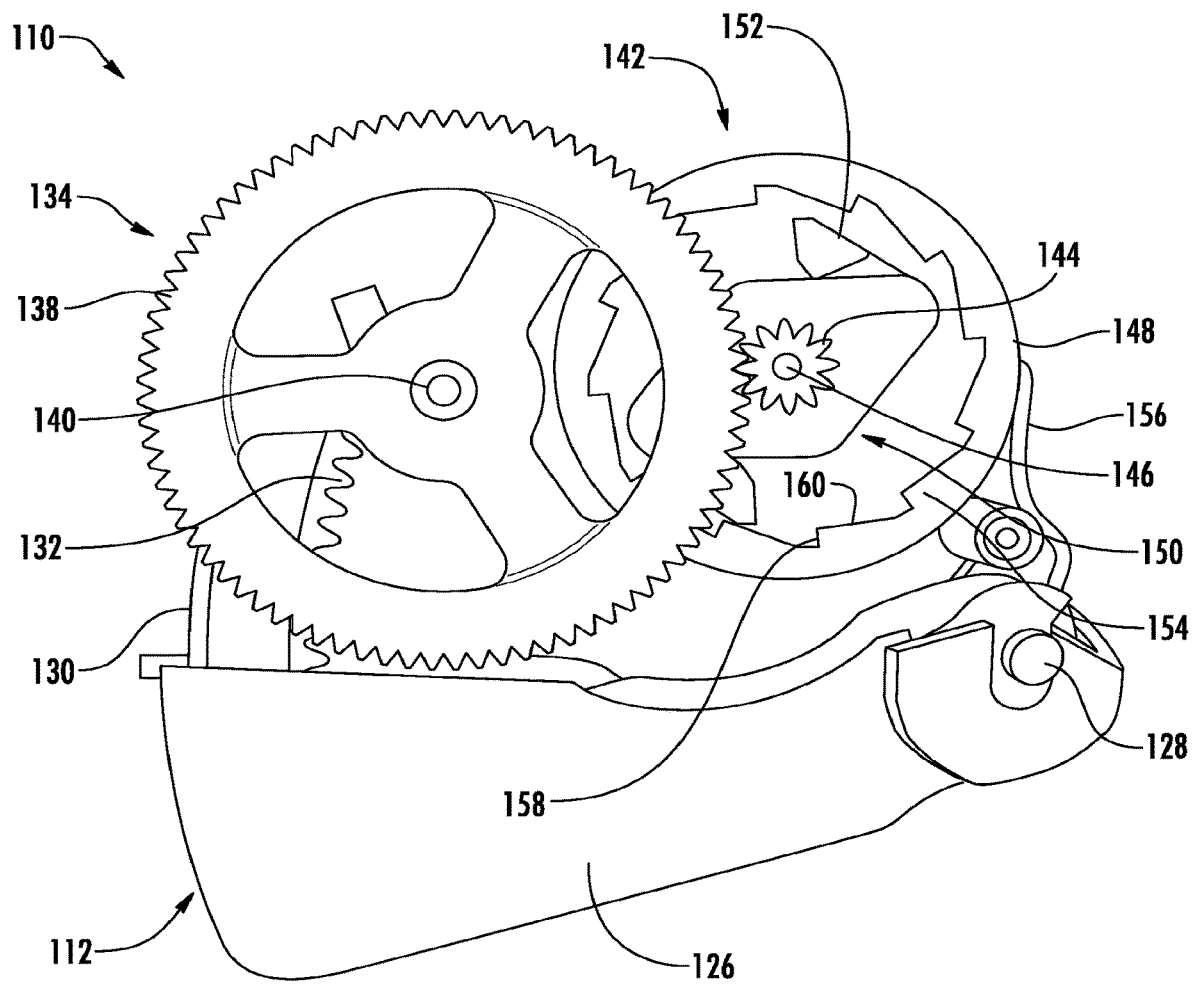
Figure 6:
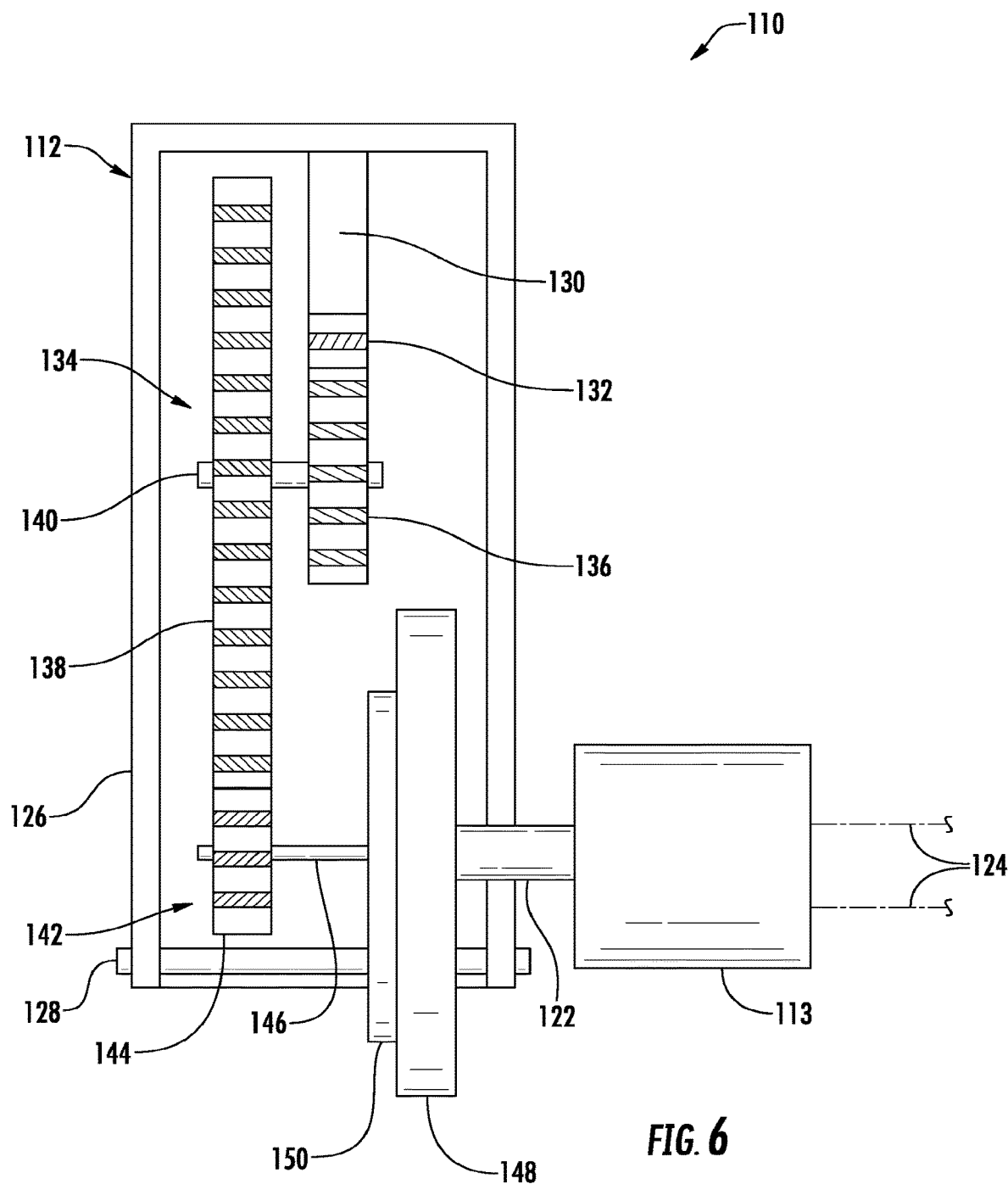

Having thus described the disclosure in the foregoing general terms, reference will now be made to the accompanying drawings, which are not necessarily drawn to scale, and wherein:

FIG. 1 illustrates a side view of an aerosol delivery device including a control body and a cartridge according to an example embodiment of the present disclosure;

FIG. 2 illustrates a modified sectional view through the control body of the aerosol delivery device of FIG. 1 according to an example embodiment of the present disclosure;

FIG. 3 illustrates a modified sectional view through the aerosol delivery device of FIG. 1 according to an example embodiment of the present disclosure;

FIG. 4 illustrates an exploded view of the cartridge of FIG. 1 according to an example embodiment of the present disclosure;

FIG. 5 illustrates a major side view of an electrical generator assembly of the aerosol delivery device of FIG. 1 according to an example embodiment of the present disclosure;

FIG. 6 illustrates a minor side view of the electrical generator assembly of FIG. 5; and FIG. 7 illustrates an aerosol production method according to an example embodiment of the present disclosure.

DETAILED DESCRIPTION OF PREFERRED EMBODIMENTS

The present disclosure will now be described more fully hereinafter with reference to exemplary embodiments thereof. These exemplary embodiments are described so that this disclosure will be thorough and complete, and will fully convey the scope of the disclosure to those skilled in the art. Indeed, the disclosure may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural variations unless the context clearly dictates otherwise.

Aerosol delivery devices according to the present disclosure may use electrical energy to heat a material (preferably without combusting the material to any significant degree) to form an inhalable substance; such articles most preferably being sufficiently compact to be considered "hand-held" devices. An aerosol delivery device may provide some or all of the sensations (e.g., inhalation and exhalation rituals, types of tastes or flavors, organoleptic effects, physical feel, use rituals, visual cues such as those provided by visible aerosol, and the like) of smoking a cigarette, cigar, or pipe, without any substantial degree of combustion of any component of that article or device. The aerosol delivery device may not produce smoke in the sense of the aerosol resulting from by-products of combustion or pyrolysis of tobacco, but rather, that the article or device most preferably yields vapors (including vapors within aerosols that can be considered to be visible aerosols that might be considered to be described as smoke-like) resulting from volatilization or vaporization of certain components of the article or device, although in other embodiments the aerosol may not be visible. In highly preferred embodiments, aerosol delivery devices may incorporate tobacco and/or components derived from tobacco. As such, the aerosol delivery device can be characterized as an electronic smoking article such as an electronic cigarette.

Aerosol delivery devices of the present disclosure also can be characterized as being vapor-producing articles or medicament delivery articles. Thus, such articles or devices can be adapted so as to provide one or more substances (e.g., flavors and/or pharmaceutical active ingredients) in an inhalable form or state. For example, inhalable substances can be substantially in the form of a vapor (i.e., a substance that is in the gas phase at a temperature lower than its critical point). Alternatively, inhalable substances can be in the form of an aerosol (i.e., a suspension of fine solid particles or liquid droplets in a gas). For purposes of simplicity, the term "aerosol" as used herein is meant to include vapors, gases and aerosols of a form or type suitable for human inhalation, whether or not visible, and whether or not of a form that might be considered to be smoke-like.

In use, aerosol delivery devices of the present disclosure may be subjected to many of the physical actions employed by an individual in using a traditional type of smoking article (e.g., a cigarette, cigar or pipe that is employed by lighting and inhaling tobacco). For example, an aerosol delivery device of the present disclosure can be hand-held by a user, a user can draw on a portion of the article for inhalation of aerosol produced by that article, a user can take puffs at selected intervals of time, and the like.

Aerosol delivery devices of the present disclosure generally include a housing and a number of additional components coupled thereto and/or positioned within the housing, and some of the components may be removable or replaceable. The overall design of the housing can vary, and the overall size and shape of the housing can vary. The smoking articles can include a cartridge, which can be defined by an outer body or cover—e.g., an elongated body resembling the shape of a portion of a cigarette or cigar. For example, an outer cover or body of the cartridge can be substantially tubular in shape and, as such, resemble the shape of a conventional cigarette or cigar. In some embodiments, the housing may contain one or more reusable components (e.g., a rechargeable battery and various electronics for controlling the operation of that article), and the cartridge can be removable, refillable, and/or disposable.

Aerosol delivery devices of the present disclosure most preferably comprise some combination of a power source (i.e., an electrical power source), at least one control component (e.g., means for actuating, controlling, regulating and/or ceasing power for heat generation, such as by controlling electrical current flow from the power source to other components of the aerosol delivery device), a heater or heat generation component (e.g., an electrical resistance heating element or component commonly referred to as part of an "atomizer"), and an aerosol precursor composition (e.g., commonly a liquid capable of yielding an aerosol upon application of sufficient heat, such as ingredients commonly referred to as "smoke juice," "e-liquid" and "e-juice"), and a mouthend region or tip for allowing draw upon the aerosol delivery device for aerosol inhalation (e.g., a defined air flow path through the article such that aerosol generated can be withdrawn therefrom upon draw). When the heating element heats the aerosol precursor composition, an aerosol is formed, released, or generated in a physical form suitable for inhalation by a consumer. It should be noted that the foregoing terms are meant to be interchangeable such that reference to release, releasing, releases, or released includes form or generate, forming or generating, forms or generates, and formed or generated. Specifically, an inhalable substance is released in the form of a vapor or aerosol or mixture thereof.

As noted above, the aerosol delivery device may incorporate a battery and/or other electrical power source (e.g., a capacitor) to provide current flow sufficient to provide various functionalities to the aerosol delivery device, such as powering of a heater, powering of control systems, powering of indicators, and the like. The power source can take on various embodiments. Preferably, the power source is able to deliver sufficient power to rapidly heat the heating element to provide for aerosol formation and power the aerosol delivery device through use for a desired duration of time. The power source preferably is sized to fit conveniently within the aerosol delivery device so that the aerosol delivery device can be easily handled. Additionally, a preferred power source is of a sufficiently light weight to not detract from a desirable smoking experience. A battery for use in the present devices may be replaceable, removable, and/or rechargeable and thus may be combined with any type of recharging technology, including connection to a typical alternating current electrical outlet, connection to a car charger (i.e., a cigarette lighter receptacle), and connection to a computer, such as through a universal serial bus (USB) cable or connector. In one preferred embodiment the electrical power source comprises a lithium-ion battery, which may light weight, rechargeable, and provide a large energy storage capacity. Examples of electrical power sources are described in U.S. Pat. App. Pub. No. 2010/0028766 to Peckerar et al., the disclosure of which is incorporated herein by reference in its entirety.

An aerosol delivery device according to the present disclosure preferably incorporates a sensor or detector for control of supply of electric power to a heat generation element when aerosol generation is desired (e.g., upon draw during use). As such, for example, there is provided a manner or method for turning off the power supply to the heat generation element when the aerosol generating piece is not be drawn upon during use, and for turning on the power supply to actuate or trigger the generation of heat by the heat generation element during draw. For example, with respect to a flow sensor, representative current regulating components and other current controlling components including various microcontrollers, sensors, and switches for aerosol delivery devices are described in U.S. Pat. No. 4,735,217 to Gerth et al.; U.S. Pat. No. 4,947,874 to Brooks et al.; U.S. Pat. No. 5,372,148 to McCafferty et al.; U.S. Pat. No. 6,040,560 to Fleischhauer et al.; U.S. Pat. No. 7,040,314 to Nguyen et al.; U.S. Pat. No. 8,205,622 to Pan; and U.S. Pat. No. 8,881,737 to Collet et al.; U.S. Pat. Pub. Nos. 2009/0230117 to Fernando et al.; and 2014/0270727 to Ampolini et al.; and 2015/0257445 to Henry et al.; which are incorporated herein by reference in their entireties. Additional representative types of sensing or detection mechanisms, structures, components, configurations, and general methods of operation thereof, are described in U.S. Pat. No. 5,261,424 to Sprinkel, Jr.; U.S. Pat. No. 5,372,148 to McCafferty et al.; and PCT WO 2010/003480 to Flick; which are incorporated herein by reference in their entireties.

In some embodiments, the aerosol delivery device can include an indicator, which may comprise one or more light emitting diodes. The indicator can be in communication with the control component through a connector circuit and illuminate, for example, during a user draw on the mouthend as detected by the flow sensor.

Various elements that may be included in the housing are described in U.S. App. Pub. No. 2015/0245658 to Worm et al., which is incorporated herein by reference in its entirety. Still further components can be utilized in the aerosol delivery device of the present disclosure. For example, U.S. Pat. No. 5,154,192 to Sprinkel et al. discloses indicators for smoking articles; U.S. Pat. No. 5,261,424 to Sprinkel, Jr. discloses piezoelectric sensors that can be associated with the mouth-end of a device to detect user lip activity associated with taking a draw and then trigger heating; U.S. Pat. No. 5,372,148 to McCafferty et al. discloses a puff sensor for controlling energy flow into a heating load array in response to a pressure drop through a mouthpiece; U.S. Pat. No. 5,967,148 to Harris et al. discloses receptacles in a smoking device that include an identifier that detects a non-uniformity in infrared transmissivity of an inserted component and a controller that executes a detection routine as the component is inserted into the receptacle; U.S. Pat. No. 6,040,560 to Fleischhauer et al. describes a defined executable power cycle with multiple differential phases; U.S. Pat. No. 5,934,289 to Watkins et al. discloses photonic-optronic components; U.S. Pat. No. 5,954,979 to Counts et al. discloses means for altering draw resistance through a smoking device; U.S. Pat. No. 6,803,545 to Blake et al. discloses specific battery configurations for use in smoking devices; U.S. Pat. No. 7,293,565 to Griffen et al. discloses various charging systems for use with smoking devices; U.S. Pat. No. 8,402,976 to Fernando et al. discloses computer interfacing means for smoking devices to facilitate charging and allow computer control of the device; U.S. Pat. No. 8,689,804 to Fernando et al. discloses identification systems for smoking devices; and WO 2010/003480 to Flick discloses a fluid flow sensing system indicative of a puff in an aerosol generating system; all of the foregoing disclosures being incorporated herein by reference in their entireties. Further examples of components related to electronic aerosol delivery articles and disclosing materials or components that may be used in the present article include U.S. Pat. No. 4,735,217 to Gerth et al.; U.S. Pat. No. 5,249,586 to Morgan et al.; U.S. Pat. No. 5,666,977 to Higgins et al.; U.S. Pat. No. 6,053,176 to Adams et al.; U.S. Pat. No. 6,164,287 to White; U.S. Pat. No. 6,196,218 to Voges; U.S. Pat. No. 6,810,883 to Felter et al.; U.S. Pat. No. 6,854,461 to Nichols; U.S. Pat. No. 7,832,410 to Hon; U.S. Pat. No. 7,513,253 to Kobayashi; U.S. Pat. No. 7,896,006 to Hamano; U.S. Pat. No. 6,772,756 to Shayan; U.S. Pat. Nos. 8,156,944 and 8,375,957 to Hon; U.S. Pat. No. 8,794,231 to Thorens et al.; U.S. Pat. No. 8,851,083 to Oglesby et al.; U.S. Pat. Nos. 8,915,254 and 8,925,555 to Monsees et al.; U.S. Pat. App. Pub. Nos. 2006/0196518 and 2009/0188490 to Hon; U.S. Pat. App. Pub. No. 2010/0024834 to Oglesby et al.; U.S. Pat. App. Pub. No. 2010/0307518 to Wang; WO 2010/091593 to Hon; WO 2013/089551 to Foo; and U.S. Pat. App. Pub. No.

2014/0261408 to DePiano et al., each of which is incorporated herein by reference in its entirety.

The aerosol precursor composition, also referred to as a vapor precursor composition, may comprise a variety of components including, by way of example, any of a polyhydric alcohol (e.g., glycerin, propylene glycol, or a mixture thereof), nicotine, tobacco, tobacco extract, and/or flavorants. Various components that may be included in the aerosol precursor composition are described in U.S. Pat. No. 7,726,320 to Robinson et al., which is incorporated herein by reference in its entirety. Additional representative types of aerosol precursor compositions are set forth in U.S. Pat. No. 4,793,365 to Sensabaugh, Jr. et al.; U.S. Pat. No. 5,101,839 to Jakob et al.; PCT WO 98/57556 to Biggs et al.; and Chemical and Biological Studies on New Cigarette Prototypes that Heat Instead of Burn Tobacco, R. J. Reynolds Tobacco Company Monograph (1988); the disclosures of which are incorporated herein by reference in their entireties. Other aerosol precursors which may be employed in the aerosol delivery device of the present disclosure include the aerosol precursors included in the VUSE® product by R. J. Reynolds Vapor Company, the BLU™ product by Lorillard Technologies, the Mistic Menthol product by Mistic Ecigs, and the Vype product by CN Creative Ltd. Also desirable are the so-called "Smoke Juices" for electronic cigarettes that have been available from Johnson Creek Enterprises LLC. Additional exemplary formulations for aerosol precursor materials that may be used according to the present disclosure are described in U.S. Pat. Pub. No. 2013/0008457 to Zheng et al., and U.S. Pat. No. 9,254,002 to Chong et al., the disclosures of which are incorporated herein by reference in their entireties.

The aerosol delivery device preferably includes a reservoir. In some embodiments, a reservoir may comprise a container for storing a liquid aerosol precursor, a fibrous substrate, or a combination of a fibrous substrate and a container. A fibrous substrate suitable for use as a reservoir may comprise a plurality of layers of nonwoven fibers and may be formed substantially into the shape of a tube. For example, the formed tube may be shaped and sized for placement within the outer body or cover of a cartridge for use in the aerosol delivery device. Liquid components, for example, can be sorptively retained by the fibrous substrate and/or be retained within a reservoir container. The reservoir preferably is in fluid connection with a liquid transport element. Thus, the liquid transport element may be configured to transport liquid from the reservoir to a heating element, such as via capillary action and/or via active transport—e.g., pumping or controlled movement with a valve. Representative types of substrates, reservoirs, or other components for supporting the aerosol precursor are described in U.S. Pat. No. 8,528,569 to Newton and U.S. Pat. No. 8,715,070 to Davis et al.; and U.S. Pat. App. Pub. Nos. 2014/0261487 to Chapman et al. and 2015/0216232 to Bless et al.; which are incorporated herein by reference in their entireties.

The liquid transport element may be in direct contact with the heating element. Various wicking materials, and the configuration and operation of those wicking materials within certain types of aerosol delivery devices, are set forth in U.S. Pat. No. 8,910,640 to Sears et al., which is incorporated herein by reference in its entirety. A variety of the materials disclosed by the foregoing documents may be incorporated into the present devices in various embodiments, and all of the foregoing disclosures are incorporated herein by reference in their entireties.

The heating element may comprise a wire defining a plurality of coils wound about the liquid transport element. In some embodiments the heating element may be formed by winding the wire about the liquid transport element as described in U.S. Pat. No. 9,210,738 to Ward et al, which is incorporated herein by reference in its entirety. Further, in some embodiments the wire may define a variable coil spacing, as described in U.S. Pat. No. 9,277,770 to DePiano et al., which is incorporated herein by reference in its entirety. Various embodiments of materials configured to produce heat when electrical current is applied therethrough may be employed to form the heating element. Example materials from which the wire coil may be formed include titanium, platinum, silver, palladium, Kanthal (FeCrAl), Nichrome, Molybdenum disilicide ($MoSi_2$), molybdenum silicide (MoSi), Molybdenum disilicide doped with Aluminum ($Mo(Si,Al)_2$), graphite and graphite-based materials; and ceramic (e.g., a positive or negative temperature coefficient ceramic). The heating element may comprise a wire defining a mesh, screen or lattice structure positioned about the liquid transport element. Example materials from which the wire mesh, screen, or lattice may be formed include titanium, platinum, silver, palladium, Kanthal (FeCrAl), Nichrome, Molybdenum disilicide ($MoSi_2$), molybdenum silicide (MoSi), Molybdenum disilicide doped with Aluminum ($Mo(Si,Al)_2$), graphite and graphite-based materials; and ceramic (e.g., a positive or negative temperature coefficient ceramic). An example embodiment of a mesh heating element is disclosed in U.S. Pat. App. Pub. No. 2015/0034103 to Hon. In some embodiments, a stamped heating element may be employed in the atomizer, as described in U.S. Pat. Pub. No. 2014/0270729 to DePiano et al., which is incorporated herein by reference in its entirety. Further to the above, additional representative heating elements and materials for use therein are described in U.S. Pat. No. 5,060,671 to Counts et al.; U.S. Pat. No. 5,093,894 to Deevi et al.; U.S. Pat. No. 5,224,498 to Deevi et al.; U.S. Pat. No. 5,228,460 to Sprinkel Jr., et al.; U.S. Pat. No. 5,322,075 to Deevi et al.; U.S. Pat. No. 5,353,813 to Deevi et al.; U.S. Pat. No. 5,468,936 to Deevi et al.; U.S. Pat. No. 5,498,850 to Das; U.S. Pat. No. 5,659,656 to Das; U.S. Pat. No. 5,498,855 to Deevi et al.; U.S. Pat. No. 5,530,225 to Hajaligol; U.S. Pat. No. 5,665,262 to Hajaligol; U.S. Pat. No. 5,573,692 to Das et al.; and U.S. Pat. No. 5,591,368 to Fleischhauer et al., the disclosures of which are incorporated herein by reference in their entireties. Further, chemical heating may be employed in other embodiments. Various additional examples of heaters and materials employed to form heaters are described in U.S. Pat. No. 8,881,737 to Collett et al., which is incorporated herein by reference, as noted above.

A variety of heater components may be used in the present aerosol delivery device. In various embodiments, one or more microheaters or like solid state heaters may be used. Embodiments of microheaters and atomizers incorporating microheaters suitable for use in the presently disclosed devices are described in U.S. Pat. No. 8,881,737 to Collett et al., which is incorporated herein by reference in its entirety.

One or more heating terminals (e.g., positive and negative terminals) may connect to the heating element so as to form an electrical connection with the power source and/or a terminal may connect to one or more control elements of the aerosol delivery device. Further, various examples of electronic control components and functions performed thereby are described in U.S. Pat. App. Pub. No. 2014/0096781 to Sears et al., which is incorporated herein by reference in its entirety.

Various components of an aerosol delivery device according to the present disclosure can be chosen from components described in the art and commercially available. Reference is made for example to the reservoir and heater system for controllable delivery of multiple aerosolizable materials in an electronic smoking article disclosed in U.S. Pat. App. Pub. No. 2014/0000638 to Sebastian et al., which is incorporated herein by reference in its entirety.

In further embodiments, one or more components of the aerosol delivery device may be formed from one or more carbon materials, which may provide advantages in terms of biodegradability and absence of wires. In this regard, the heating element may comprise carbon foam, the reservoir may comprise carbonized fabric, and graphite may be employed to form an electrical connection with the battery and controller. An example embodiment of a carbon-based cartridge is provided in U.S. Pat. App. Pub. No. 2013/0255702 to Griffith et al., which is incorporated herein by reference in its entirety.

Aerosol delivery devices are often configured in a manner that mimics aspects of certain traditional smoking devices such as cigarettes or cigars. In this regard, aerosol delivery devices typically define a substantially cylindrical configuration. For example, aerosol delivery devices often include a control body and a cartridge which attach in an end-to-end relationship to define the substantially cylindrical configuration. Such configurations may provide a look and feel that is similar to traditional smoking articles. However, aerosol delivery devices may define various other shapes and configurations such as "fob-shaped," which may be ergonomically configured and allow for usage of a relatively larger cartridge or tank.

As noted above, aerosol delivery devices typically include an electrical power source that directs power to a heating element of an atomizer to heat an aerosol precursor composition and produce a vapor. The electrical current provided by the electrical power source may additionally be employed to perform other functions such as the illumination of indicators and powering of electronic components included in the aerosol delivery device. However, electrical power sources such as batteries and capacitors have finite energy storage capacities. Thereby, such electrical power sources require periodic recharging or replacement in order to continue operating the aerosol delivery device. In certain situations, depletion of the charge in the electrical power source may prove problematic to a user. For example, a user may be isolated from an external power source during outdoor activities (e.g., hiking or traveling in remote areas). Further, external power sources may experience failures (e.g., during severe weather or natural disasters) that prevent a user from employing the external power source to recharge the electrical power source. Additionally, certain users may experience satisfaction from being "off the grid," and avoiding reliance on external power sources. As such, embodiments of the present disclosure provide aerosol delivery devices configured to address the above-noted deficiencies of existing configurations of aerosol delivery devices and/or provide other benefits.

In this regard, FIG. 1 illustrates a side view of an aerosol delivery device 100 according to the present disclosure. As illustrated, the aerosol delivery device 100 may include a control body 101, which may include a housing 102. In some embodiments the housing 102 may comprise a plastic material, but various other materials, which are preferably substantially rigid, may be employed in other embodiments. The housing 102 may be unitary or comprise multiple pieces. For example, the housing 102 may include a body portion 102a, which may itself comprise one or more pieces, and an access door 102b. As further illustrated in FIG. 1, the aerosol delivery device 100 may additionally include a cartridge 200, which may be at least partially received in the control body 101. The aerosol delivery device 102 may define a tubular configuration, a "fob" shape as illustrated in FIG. 1, or any other shape.

FIG. 2 illustrates a partially-exploded sectional view through the control body 101 of the aerosol delivery device 100. As illustrated, the housing 102 may define an electrical circuit cavity 104. In particular, the electrical circuit cavity 104 may be defined in the body portion 102a of the housing 102. The electrical circuit cavity 104 may be closed by, and accessed via, the access door 102b. As described in detail below, the electrical circuit cavity 104 may be configured to receive at least a portion of an electrical circuit 105. The electrical circuit 105 may include one or more components, which are described hereinafter, and which may be connected by wires or other electrical connectors.

Further, the housing 102 may define a cartridge cavity 106. As illustrated in FIG. 3, the cartridge cavity 106 may be configured to receive the cartridge 200. In this regard, the housing 102 may define an external opening 108 at the cartridge cavity 106 configured to receive the cartridge 200 therethrough.

Various embodiments of the cartridge 200 may be employed in the aerosol delivery device 100. In this regard, a side view of the cartridge 200, rather than a sectional view therethrough, is illustrated in FIG. 3 in light of the various possible configurations of the components of the cartridge. However, one example embodiment of the cartridge is illustrated in FIG. 4.

In particular, FIG. 4 illustrates an example embodiment of the cartridge 200 in an exploded configuration. As illustrated, the cartridge 200 may comprise a base 202, a control component terminal 204, an electronic component 206, a flow director 208, an atomizer 210, a reservoir 212 (e.g., a reservoir substrate), an outer body 214, a mouthpiece 216, a label 218, and first and second heating terminals 220a, 220b according to an example embodiment of the present disclosure. The atomizer 210 may comprise a liquid transport element 222 and a heating element 224. In this regard, when electrical current is directed to the heating terminal 224, the heating terminal may heat aerosol precursor composition directed thereto by the liquid transport element 222 from the reservoir 212.

However, it should be understood that the cartridge 200 may include other components in some embodiments. For example, although the atomizer is described as including a heating element, various other embodiments of atomizers may be employed such as a positive displacement atomizer as described in U.S. Pat. App. Pub. No. 2015/0117842 to Brammer et al., or a pressurized atomizer as described in U.S. Pat. App. Pub. No. 2015/0117841 to Brammer et al., each of which is incorporated herein by reference in its entirety. Further, although the cartridge 200 is generally described herein as including a reservoir substrate, in other embodiments the cartridge may hold an aerosol precursor composition therein without the use of a reservoir substrate (e.g., through use of a container or vessel that stores the aerosol precursor composition therein). The cartridge may additionally include a base shipping plug engaged with the base and/or a mouthpiece shipping plug engaged with the mouthpiece in order to protect the base and the mouthpiece and prevent entry of contaminants therein prior to use as disclosed, for example, in U.S. Pat. No. 9,220,302 to Depiano et al., which is incorporated herein by reference in its entirety. Various other details with respect to the components that may be included in the cartridge, are provided, for example, in U.S. Pat. App. Pub. No. 2014/0261495 to Novak et al. and U.S. Pat. App. Pub. No. 2015/0335071 to Brinkley et al., which are incorporated herein by reference in their entireties.

Returning to FIGS. 2 and 3, as noted above, the control body 101 may include the electrical circuit 105, which may be at least partially received in, or otherwise engaged with, the housing 102 (e.g., in the electrical circuit cavity 106). The electrical circuit 105 may include an electrical generator assembly 110. The electrical generator assembly 110 may include a moveable input member 112 and an electrical generator 113. In this regard, the electrical generator 113 may be configured to produce an electrical current from movement of the moveable input member 112.

The electrical circuit 105 may be configured to direct the electrical current to an atomizer. For example, the aerosol delivery device 100 may include the cartridge 200 which may be configured to engage and disengage the control body 101, and which may include the atomizer 210 (see, FIG. 4). In other embodiments the control body may be configured to engage a tank, which may be configured to contain a relatively larger volume of aerosol precursor composition. An example embodiment of an aerosol delivery device including a tank is described in U.S. patent application Ser. No. 14/981,051 to Phillips et al., filed Dec. 28, 2015, which is incorporated herein by reference in its entirety. In an additional embodiment the aerosol delivery device may include an atomizer substantially permanently coupled thereto. Thus, although the aerosol delivery device is generally described herein as including a control body and a separate cartridge, in other embodiments the components thereof may be combined in a single unit.

Regardless of the particular configuration of the atomizer 210 (see, FIG. 4), the electrical circuit 105 may be configured to direct the electrical current thereto to produce an aerosol from the aerosol precursor composition, which may be stored in the reservoir 212 (see, FIG. 4). In this regard, the electrical circuit 105 may be coupled to the atomizer 210. Thereby, a connector may be configured to direct the electrical current to the atomizer 210 to produce an aerosol from an aerosol precursor composition. For example, the electrical circuit 105 may include a coupler 114 configured to engage the cartridge 200. Thereby, as the cartridge 200 is inserted into the cartridge cavity 106, the cartridge 200 may engage the coupler 114. Accordingly, the cartridge 200 may establish an electrical connection with the electrical circuit 105. However, as may be understood, in other embodiments the connector may comprise wires or other components configured to directly or indirectly engage the atomizer, and the particular configuration thereof may depend upon whether the atomizer is permanently affixed to the electrical circuit or configured to be disengaged therefrom.

The electrical circuit 105 may further include a controller 116. The controller 116 may be configured to control one or more operations of the aerosol delivery device 100. For example, the controller 116 may verify that the cartridge 200 is authentic using information provided by the electronic component 206 (see, FIG. 4). Usage of the cartridge 200 may be allowed only if the cartridge is determined to be authentic.

Further, the electrical circuit 105 may include a flow sensor 118, which may be positioned at, or in fluid communication with, the coupler 114. Thereby, when a user draws on the cartridge 200, the flow sensor 118 (e.g. a pressure sensor) may detect the draw. In response, the controller 116 may direct current to the cartridge 200 such that that the heating element 224 of the atomizer 210 (see, FIG. 4) produces heat and vaporizes the aerosol precursor composition to produce a vapor, which may be directed to the user. An example embodiment of a controller for an aerosol delivery device is disclosed in U.S. Pat. App. Pub. No. 2015/0245658 to Worm et al., which is incorporated herein by reference in its entirety.

In some embodiments the electrical circuit 105 may further comprise a communication module. The communication module may be configured to communicate via Bluetooth or any other communication standard. Examples of communication modules and related antenna components which may be included in the aerosol delivery device 100 are described in U.S. patent application Ser. No. 14/802,789, filed Jul. 17, 2015, and Ser. No. 14/638,562, filed Mar. 4, 2015, each to Marion et al., which are incorporated herein by reference in their entireties.

In some embodiments the electrical circuit 105 may additionally include an electronic display 120 (e.g., a liquid crystal display). The electronic display 120 may output information regarding the aerosol delivery device 100. For example, the data displayed by the electronic display 120 may include a remaining cartridge aerosol precursor composition level, a remaining power source level, historical usage information, heat and aerosol output settings, a charging status, a communication status (e.g., when linked to another device via Bluetooth or other communication protocol), the time, and/or various other data.

As noted above, the aerosol delivery device 100 may include the electrical generator assembly 110. As may be understood various embodiments of the electrical generator assembly 110 may be employed. In this regard, the electrical generator assembly 110 is schematically illustrated in FIGS. 1-3. However, FIGS. 5 and 6 illustrate major and minor side views of the electrical generator assembly 110 according to an example embodiment of the present disclosure.

As noted above, the electrical generator assembly 110 may include a moveable input member 112 and an electrical generator 113 (see, e.g., FIG. 2). As illustrated in FIG. 6, the electrical generator assembly 110 may further comprise a generator shaft 122, which may extend from the electrical generator 113. The moveable input member 112 may rotate the generator shaft 122 in the manner described below. Rotation of the generator shaft 122 may rotate magnets relative to a conductive wire loop. Thereby, electrical current may be produced via electromagnetic induction. Thereby, the induced electrical current may be outputted by a plurality of electrical connectors 124 (e.g., electrical wires).

As noted above, the moveable input member 112 may be configured to rotate the generator shaft 122. In this regard, the moveable input member 112 may be configured to move in response to a force imparted by a user. For example, as illustrated in FIGS. 5 and 6, the moveable input member 112 may comprise a lever 126 engaged with a pin 128 at an end thereof. Further, as illustrated in FIG. 2, the moveable input member 112, and in particular the level 126 (see, e.g., FIG. 5) may extend out of the housing 102. In this regard, the ergonomic "fob" shape of the housing 102 may facilitate engagement of the moveable input member 112 by allowing a user to squeeze the moveable input member in one hand.

Returning to FIGS. 5 and 6, when a user squeezes the lever 126, the moveable input member 112 may pivot about the pin 128. Further, the moveable input member 112 may include a gear track 130 including a toothed surface 132. The gear track 130 may be engaged with an end of the lever 126 opposite from the pin 128 in order to maximize leverage and provide a relatively longer displacement thereof during movement of the lever.

The toothed surface 132 of the gear track 130 may be configured to engage and rotate a transfer gear assembly 134. As illustrated in FIG. 6, the transfer gear assembly 134 may include an input gear 136 and an output gear 138. The toothed surface 132 of the gear track 130 may be engaged with the input gear 136. Thereby, as the level 126 is depressed, the toothed surface 132 of the gear track may intermesh with the input gear 136, thereby causing the transfer gear assembly 134 to rotate. In this regard, the input gear 136 and the output gear 138 may each be rotationally fixed to a transfer shaft 140 such that rotation of the input gear causes rotation of the output gear.

The transfer gear assembly 134 may be configured to rotate the generator shaft 122 extending from the electrical generator 113. In this regard, in one embodiment the output gear 138 may directly rotate the generator shaft 122. However, as illustrated, in another embodiment the output gear 138 may be engaged with a flywheel assembly 142.

In this regard, the flywheel assembly 142 may include a flywheel gear 144, a flywheel shaft 146, and a flywheel 148. The output gear 138 of the transfer gear assembly 134 may engage the flywheel gear 144. The flywheel gear 138 may be rotationally fixed to the flywheel shaft 146 such that the flywheel shaft rotates when the flywheel gear 144 is rotated by the output gear 138 of the transfer gear assembly 134.

Further, the flywheel 148 may rotate when the flywheel shaft 146 rotates. In this regard, in some embodiments the flywheel may be rotationally fixed to the flywheel shaft. However, in the illustrated embodiment the flywheel assembly 142 further includes an interlocking member 150. As illustrated in FIG. 5, the interlocking member 150 may include at least one pawl 152. Each pawl 152 may be configured to engage one of a plurality of inner teeth 154 defined by the flywheel 148. In particular, the one or more pawls 152 may engage the inner teeth 154 when the output gear 138 rotates the flywheel gear 144 and the flywheel shaft 146. In this regard, the interlocking member 150 may be rotationally fixed to the flywheel shaft 146. Thereby, as the interlocking member 150 is rotated, centrifugal force and/or gravity may cause one or more of the one or more pawls 152 to extend outwardly and respectively engage an inner tooth 154 of the flywheel 148 such that the flywheel rotates. The flywheel shaft 146 and the generator shaft 122 may be independently rotatable. However, the flywheel 148 may be rotationally fixed to the generator shaft 122 (see, FIG. 6) such that when the flywheel is rotated, the electrical generator 113 outputs electrical current via the electrical connectors 124 (see, FIG. 6) as described above.

Thus, as described above, the electrical generator 113 (see, e.g., FIG. 6) may be configured to produce an electrical current from movement of the moveable input member 112. In particular, in the example embodiment described above, the movement of the moveable input member 112 is a pivoting movement of the lever 126. The lever 126 may be depressed until it is substantially flush or parallel with the body portion 102a of the housing 102 (see, e.g., FIG. 1). When the user releases the lever 126 or ceases applying force thereto, the lever may return to the initial, extended starting configuration. In this regard, as illustrated in FIG. 5, a spring 156 (e.g., a torsion spring) may be engaged with the lever 126 such that the lever is spring-loaded and automatically returns to the initial, extended starting configuration when released by a user.

As the lever 126 retracts to the initial, extended starting position, the motion of the gear track 130 may be reversed, which may in-turn cause the transfer gear assembly 134 to rotate (e.g., in a counterclockwise direction in terms of the orientation illustrated in FIG. 5). Thereby, the flywheel gear 144, the flywheel shaft 146, and the interlocking member 150 may rotate in a clockwise direction.

However, the flywheel 148 may continue rotating after the inward pivoting movement of the lever 126 ceases and during retraction of the lever to the initial, extended starting configuration without a change in the rotational direction thereof. In this regard, the flywheel 148 may be formed from a relatively dense material (e.g., steel or other metal), such that rotational inertia of the flywheel may continue to rotate the generator shaft 122 and thereby the generator 113 may continue to produce electrical current even when the inward pivoting movement of the lever 126 has stopped until motion of the flywheel ceases.

The interlocking member 150 may allow continued rotation of the flywheel 148 as noted above. In this regard, each of the inner teeth 154 may define an interlocking surface 158 and a non-interlocking surface 160. The interlocking surface 158 may be positioned on a side of each inner tooth 154 configured to engage the pawl 152 when the interlocking member 150 rotates in a first direction (e.g., counterclockwise in terms of the orientation illustrated in FIG. 5) corresponding to inward pivoting motion of the lever 126 as it is squeezed to impart rotary motion to the flywheel 148. Conversely, the non-interlocking surface 160 may be positioned at an opposing side of the inner tooth 154 that may contact one or more pawls 152 when the flywheel 148 rotates and the interlocking member 150 is stationary and when the lever 126 retracts to the initial, extended starting configuration when the interlocking member 150 rotates in a second direction (e.g., clockwise in terms of the orientation illustrated in FIG. 5). Thus, the flywheel 148 may substantially disconnect from the interlocking member 150 after motion is imparted thereto by the interlocking member. Thereby, the interlocking member 150 may be configured to impart rotational motion to the flywheel 148 in only one direction and allow continued rotation of the flywheel even when the interlocking member is not rotating or is rotating in the opposite direction.

Note that the embodiment of the electrical generator assembly 110 described above is provided for example purposes only. Various other embodiments of electrical generator assemblies including a moveable input member may be included in the aerosol delivery device. For example, in other embodiments the electrical generator assembly may include a linear motion generator, a hand-crank generator, or any other embodiment of electrical generator assembly including a moveable input member. An example embodiment of a linear motion generator is described in U.S. Pat. No. 4,924,123 to Hamajima et al., which is incorporated by reference. An example embodiment of a hand-crank generator is described in U.S. Pat. No. 7,723,880 to Dai et al., which is incorporated herein by reference in its entirety.

As noted above with respect to FIG. 3, the electrical circuit 105 may include the electrical generator assembly 110, which may produce an electrical current that powers the components of the aerosol delivery device 100. Thereby, for example, the electrical current may be directed to the cartridge 200 as the electrical generator 113 produces the electrical current. In other words, in one embodiment the electrical current produced by the electrical generator 113 may be directed to the atomizer 210 (see, FIG. 4) of the cartridge 200 automatically and in response to the production of the electrical current, without any further user interaction required. Thereby, in this embodiment, aerosol may be produced as the user moves the moveable input member 112. Thus, for example, a user may draw on the cartridge 200 while moving the moveable input member 112.

However, in other embodiments it may be desirable to store the electrical current produced by the electrical generator 113 such that the electrical current can be used when desired and power other components of the aerosol delivery device 100 regardless of whether the electrical generator assembly 110 is presently generating electrical current. Thus, as illustrated in FIGS. 2 and 3, the electrical circuit 105 may optionally further comprise an electrical storage device 162. For example, the electrical storage device 162 may comprise a capacitor and/or a battery. In this regard, the electrical storage device 162 may be configured to receive and store the electrical current produced by the electrical generator assembly 110 and release the electrical current when needed. In some embodiments the electrical storage device 162 may be retained in the electrical circuit cavity 104 defined by the housing 102 by the access door 102b and a fastener 164.

Thereby, the electrical storage device 162 may power the electronic display 120. Further, the electrical storage device 162 may retain electrical current therein that can be directed to the atomizer 210 (see, FIG. 4). For example, the electrical current may be directed from the electrical storage device 162 to the atomizer 210 when the user draws on the cartridge 200, as detected by the flow sensor 118. In other embodiments the electrical circuit 105 may include a switch 166 configured to selectively direct the electrical current from the electrical storage device 162 to the atomizer 210. Thereby, a user may have direct control over the flow of electrical current to the atomizer 210. The switch 166 may be provided in addition to, or in place of, the flow sensor 118.

As illustrated in FIGS. 2 and 3, the electrical circuit 105 may further comprise an external power input 168 configured to charge the electrical storage device 162. In this regard, the aerosol delivery device 100 may be connected to an electrical charger that provides current to the electrical storage device 162 via the external power input 168. Thereby, for example, the electrical storage device 162 may receive an initial charge via the external power input 168 when the aerosol delivery device 100 is in a location at which electrical power is available. Thereafter, a user may recharge the electrical storage device 162 with the electrical generator assembly 110 until an electrical power source (e.g., home electrical current) is once again available. In some embodiments the external power input 168 may comprise a USB port, or any other physical connector. In another embodiment the external power input 168 may comprise an inductive receiver configured to provide for receipt of current via induction. An example embodiment of an inductive receiver is described in U.S. patent application Ser. No. 14/814,866 to Sebastian et al., filed Jul. 31, 2015, which is incorporated herein by reference.

Additionally, as illustrated in FIG. 1, in some embodiments the aerosol delivery device may further comprise a solar cell 170. The solar cell 170 may be mounted to the body portion 102a of the housing 102. The solar cell 170 may provide current to the electrical storage device 162. Thereby, the solar cell 170 may be provided in lieu of, or in addition to, one or both of the electrical generator assembly 110 and the external power input 168. An example embodiment of an aerosol delivery device including a solar cell is provided in U.S. patent application Ser. No. 15/097,049 to Sur, filed Apr. 12, 2016, which is incorporated herein by reference in its entirety.

In an additional embodiment an aerosol production method is provided. As illustrated in FIG. 7, the method may include producing an electrical current with an electrical generator assembly comprising a moveable input member at operation 302. The moveable input member may extend out of a housing. Further, the method may include directing the electrical current to an atomizer configured to receive an aerosol precursor composition from a reservoir to heat the aerosol precursor composition and produce an aerosol at operation 304. The atomizer and the reservoir may be engaged with or received within the housing.

In some embodiments the method may further comprise receiving and storing the electrical current in an electrical storage device prior to directing the electrical current to the atomizer. Additionally, directing the electrical current to the atomizer at operation 304 may comprise directing the electrical current to the atomizer in response to receipt of an input from a switch. Further, the method may include charging the electrical storage device with an external current from an external power source positioned outside of the housing.

In some embodiments directing the electrical current to the atomizer at operation 304 may comprise directing the electrical current through a coupler to a cartridge including the atomizer and the reservoir. Producing the electrical current with the electrical generator assembly at operation 302 may include rotating a generator shaft extending from an electrical generator with the moveable input member. Producing the electrical current with the electrical generator assembly at operation 302 may further comprise rotating a transfer gear assembly with the moveable input member. Additionally, producing the electrical current with the electrical generator assembly at operation 302 may further comprise rotating a flywheel assembly. Producing the electrical current with the electrical generator assembly at operation 302 may further comprise engaging an input gear of the transfer gear assembly with the moveable input member and engaging an output gear of the transfer gear assembly with the flywheel assembly.

Many modifications and other embodiments of the disclosure will come to mind to one skilled in the art to which this disclosure pertains having the benefit of the teachings presented in the foregoing descriptions and the associated drawings. Therefore, it is to be understood that the disclosure is not to be limited to the specific embodiments disclosed herein and that modifications and other embodiments are intended to be included within the scope of the appended claims. Although specific terms are employed herein, they are used in a generic and descriptive sense only and not for purposes of limitation.

The invention claimed is:

1. An aerosol delivery device comprising:
   a housing defining an electrical circuit cavity and a cartridge cavity;
   a cartridge comprising an atomizer and an aerosol precursor composition, the cartridge configured to be at least partially disposed within the cartridge cavity;
   an electrical storage device at least partially disposed within the electrical circuit cavity and configured to receive and store an electrical current, and deliver power to the cartridge for generating an aerosol from the aerosol precursor composition; and an electrical generator assembly at least partially disposed within the housing and configured to produce the electrical current for delivery to the electrical storage device.

2. The aerosol delivery device of claim 1, wherein each of the electrical circuit cavity and the cartridge cavity extend longitudinally within the housing.

3. The aerosol delivery device of claim 1, wherein the electrical generator assembly comprises:
   a moveable input member extending out of the housing; and
   an electrical generator engaged with the moveable input member and configured to produce an electrical current from movement of the moveable input member.

4. The aerosol delivery device of claim 3, wherein the electrical generator assembly further comprises a generator shaft extending from the electrical generator and the moveable input member is configured to rotate the generator shaft of the electrical generator assembly.

5. The aerosol delivery device of claim 3, wherein the moveable input member comprises a lever.

6. The aerosol delivery device of claim 5, wherein the moveable input member further comprises a gear track.

7. The aerosol delivery device of claim 6, wherein the electrical generator assembly further comprises a transfer gear assembly and the gear track is configured to engage and rotate the transfer gear assembly and the transfer gear assembly is configured to rotate the generator shaft extending from the electrical generator.

8. The aerosol delivery device of claim 7, wherein the electrical generator assembly further comprises a flywheel assembly and the transfer gear assembly is engaged with the flywheel assembly and the flywheel assembly is engaged with the generator shaft extending from the electrical generator.

9. The aerosol delivery device of claim 8, wherein the transfer gear assembly includes an input gear and an output gear, the gear track being engaged with the input gear and the flywheel assembly being engaged with the output gear.

10. The aerosol delivery device of claim 3, wherein the electrical generator assembly further comprises a connector disposed within the cartridge cavity and configured to direct the electrical current from the electrical generator to the atomizer to produce an aerosol from the aerosol precursor composition.

11. The aerosol delivery device of claim 10, wherein the connector comprises a coupler configured to engage the cartridge.

12. The aerosol delivery device of claim 1, wherein the electrical generator assembly comprises at least one of a solar cell or an inductive receiver.

13. The aerosol delivery device of claim 10 further comprising an electrical circuit having at least a portion thereof disposed within the electrical circuit cavity.

14. The aerosol delivery device of claim 13, wherein the electrical circuit further comprises the electrical storage device configured to receive and store the electrical current.

15. The aerosol delivery device of claim 13, wherein the electrical circuit further comprises a switch configured to selectively direct the electrical current from the electrical storage device to the connector.

16. The aerosol delivery device of claim 13, wherein the electrical circuit further comprises an external power input configured to charge the electrical storage device.

\* \* \* \* \*